(12) United States Patent
Paczkowski et al.

(10) Patent No.: US 9,232,209 B2
(45) Date of Patent: Jan. 5, 2016

(54) DISPLAY MATRIX CONTROLLER AND A METHOD FOR CONTROLLING A DISPLAY MATRIX

(75) Inventors: Jacek Paczkowski, Siemianowice Slaskie (PL); Pawel Blonski, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 813 days.

(21) Appl. No.: 13/520,560

(22) PCT Filed: Jan. 21, 2011

(86) PCT No.: PCT/EP2011/050851
§ 371 (c)(1),
(2), (4) Date: Jul. 4, 2012

(87) PCT Pub. No.: WO2011/089232
PCT Pub. Date: Jul. 28, 2011

(65) Prior Publication Data
US 2012/0287251 A1 Nov. 15, 2012

(51) Int. Cl.
| | |
|---|---|
| H04N 13/04 | (2006.01) |
| H04N 13/00 | (2006.01) |
| H04N 13/02 | (2006.01) |
| G09G 3/00 | (2006.01) |
| G09G 3/36 | (2006.01) |

(52) U.S. Cl.
CPC .......... *H04N 13/0025* (2013.01); *G09G 3/003* (2013.01); *G09G 3/3611* (2013.01); *H04N 13/0003* (2013.01); *H04N 13/0055* (2013.01); *H04N 13/0239* (2013.01); *H04N 13/0438* (2013.01); *H04N 13/0497* (2013.01); *G09G 2310/08* (2013.01); *G09G 2320/0271* (2013.01); *G09G 2320/0626* (2013.01); *H04N 13/0431* (2013.01)

(58) Field of Classification Search
CPC .......... H04N 13/0497; H04N 13/0239; H04N 13/0055; H04N 13/0431
See application file for complete search history.

(56) References Cited

U.S. PATENT DOCUMENTS

| | | | | |
|---|---|---|---|---|
| 6,646,655 | B1 * | 11/2003 | Brandt | ...................... H04N 5/06 348/E5.011 |
| 2001/0050666 | A1 | 12/2001 | Huang et al. | |
| 2002/0142504 | A1 * | 10/2002 | Feldman | ................. G06F 3/147 438/30 |
| 2007/0035494 | A1 | 2/2007 | Chang | |
| 2007/0296655 | A1 * | 12/2007 | Jiang et al. | ....................... 345/87 |
| 2009/0189830 | A1 * | 7/2009 | Deering | .................... G09G 3/02 345/1.3 |
| 2012/0098830 | A1 * | 4/2012 | Kim | .............................. 345/419 |

FOREIGN PATENT DOCUMENTS

WO    WO99/26222    5/1999

* cited by examiner

*Primary Examiner* — Shawn An
(74) *Attorney, Agent, or Firm* — Mark M. Friedman

(57) ABSTRACT

One object of the invention is a display matrix controller configured to drive a display matrix (206, 308) to display frames of a source video signal, the controller comprising an input interface (203, 204) configured to provide for each frame to be displayed a frame difference information, specifying changed pixels, whose values change between a frame to be displayed and a currently displayed frame, a brightness equalizer (210) configured control the display of the frame such as to equalize the level of viewer perception of brightness to a predetermined level for each frame to be displayed depending on the frame difference information, and a matrix driving circuit (205, 307) configured to receive the frame difference information and to drive the display matrix (206, 308) to display the frame to be displayed by redrawing only the changed pixels

9 Claims, 4 Drawing Sheets

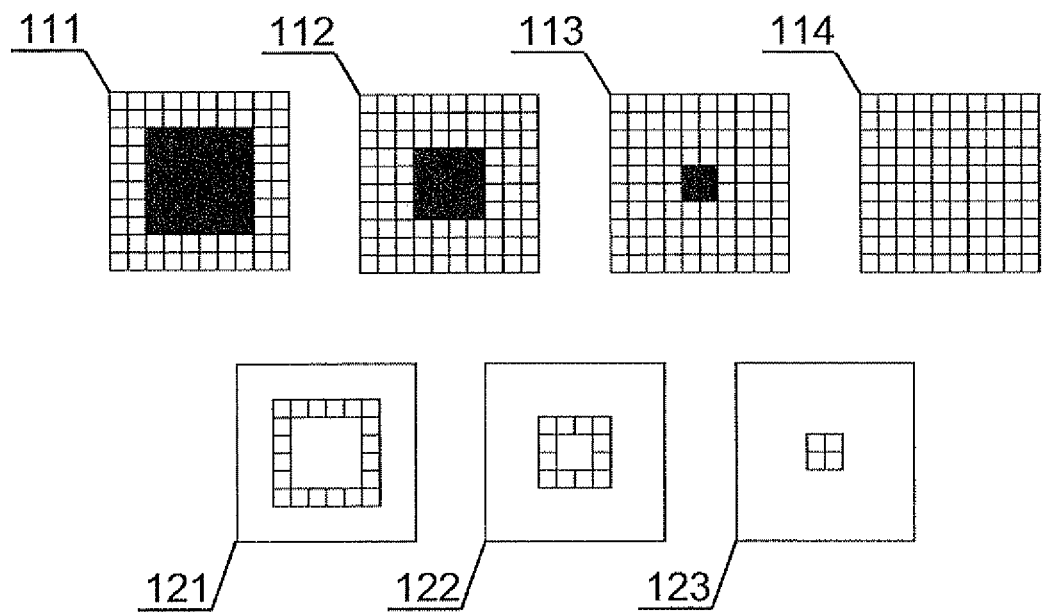
Fig. 1
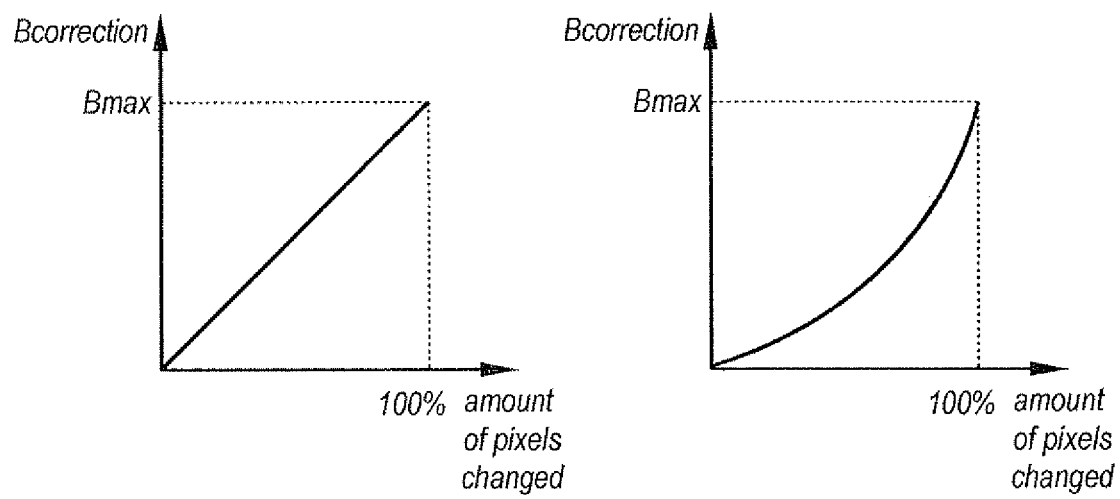
Fig. 5A
Fig. 5B

DISPLAY MATRIX CONTROLLER AND A METHOD FOR CONTROLLING A DISPLAY MATRIX

TECHNICAL FIELD

The present invention relates to display matrix controlling.

BACKGROUND ART

A typical video display unit, such as an LCD display unit, comprises a display matrix capable of displaying the video signal frames of the received video signal. A typical video signal comprises a number of frames, which when displayed at appropriate speed, such as 25 frames per second, provide the viewer with an impression of viewing a continuous scene. A typical video display unit comprises a display matrix controller, which when a new frame is to be displayed, reprograms the consecutive pixels of the display matrix. The reprogramming may be made by transmitting consecutive pixel values to the matrix or by sending consecutive batches of a group of pixels, e.g. 16 pixels. For large display matrices, such as having a resolution of 1920×1080 pixels (Full HD resolution, as defined by ITU-R BT.709), the number of pixels to be reprogrammed is quite high and requires considerably long time to redraw a frame. For example, typical LCD displays need about 5 ms to redraw the currently displayed frame to display a next frame, the time called a frame redraw time. An exemplary LCD driving circuit is disclosed in the U.S. Pat. No. 7,271,793 "Liquid crystal display device, driving method for liquid crystal display devices and inspection method for liquid crystal display devices".

A stereoscopic video signal comprises alternate left and right frames, i.e. frames to be viewed by the left eye and the right eye of the viewer, to be displayed at a higher speed than a mono video signal, such as 60 frames per second. The signal may be viewed by so-called shutter glasses, such as LCD shutter glasses, the operation of which is synchronized with the display. When the left frame is displayed, the left glass is open and the right glass is shut, while when the right frame is displayed, the left glass is shut and the right glass is open. A basic stereoscopic system of this type is disclosed in the U.S. Pat. No. 4,424,529 "Remotely triggered portable stereoscopic viewer system".

It is important to synchronize the operation of shutter glasses such that a glass is open only when the frame is completely redrawn for a given eye, so as to provide the viewer with a complete picture where a given eye will never see and section of a frame meant for the other eye. Therefore, during redrawing of a frame, the left glass and the right glass are both shut. When the frames are displayed at a rate of 60 frames per second, the time allotted for a single frame for one eye is 16.7 ms, wherein the frame is displayed for 11.7 ms and redrawn for 5 ms. In an ideal situation, when the shutter glasses are perfectly synchronized with the display, the active viewing coefficient, defining the percentage of time at which one eye of the viewer may watch the video signal, is 11.7 ms/2*16.7 ms=35%. The coefficient can be much worse for older types of displays having longer redraw time, such as 20% for a 10 ms redraw time. In practice, there may be an additional shutters closing time necessary to be introduced in order to compensate for various signal delays. Various attempts have been made to improve the synchronization, in order to arrive at a high active viewing coefficient while keeping proper synchronization, such as the method disclosed in the U.S. Pat. No. 6,678,091 "System and method to synchronize one or more shutters with a sequence of images".

In case of viewing stereoscopic video signals via shutter glasses, the lower the active viewing coefficient, the less information is received by the viewer's eyes and the worse impression of the viewed signal, due to worse brightness perception, since the signal is viewed only for a fraction of time as compared to a typical mono signal. The aim of the present invention is to improve the viewer impression when viewing a stereoscopic video signal. This aim is achieved by providing an improved method for controlling a display matrix and an improved display matrix controller, which reduce the frame redraw time and provide a uniform brightness perception for all frames of stereoscopic video signals.

DISCLOSURE OF THE INVENTION

One object of the invention is a display matrix controller configured to drive a display matrix to display frames of a source video signal, the controller comprising an input interface configured to provide for each frame to be displayed a frame difference information, specifying changed pixels, whose values change between a frame to be displayed and a currently displayed frame, a brightness equalizer configured control the display of the frame such as to equalize the level of viewer perception of brightness to a predetermined level for each frame to be displayed depending on the frame difference information, a matrix driving circuit configured to receive the frame difference information and to drive the display matrix to display the frame to be displayed by redrawing only the changed pixels.

The input interface may comprise a frames decoder configured receive encoded source frames with embedded frame difference information and to extract the frame difference information from the encoded source frames.

The display matrix controller may further comprise a next frame buffer configured to store the frame of the source video signal to be displayed, a current frame buffer configured to store the currently displayed frame of the source video signal, and the input interface may comprise a frames comparator configured to receive the frame to be displayed from the next frame buffer and the currently displayed frame from the current frame buffer and to compare the values of pixels of the frame to be displayed and the currently displayed frame to generate the frame difference information.

The brightness equalizer may comprise a pixels change optimizer configured to process the frame difference information such as to make the amount of pixels changed in the frame equal to a predefined pixels change amount.

The pixels change optimizer may be configured to select further pixels to be changed in case the frame difference information comprises an amount of pixels changed lower than the predefined pixels change amount.

The pixels change optimizer may be configured to discard some of the pixels specified in the frame difference information in case the frame difference information comprises an amount of pixels changed lower than the predefined pixels change amount.

The brightness equalizer may comprise a brightness level controller configured to control the display matrix brightness level depending on the amount of changed pixels in the frame to be displayed.

Another object of the invention is a display unit comprising the display matrix controller according to any of claims.

A further object of the invention is a method for controlling a display matrix to display frames of a source video signal, the method comprising the steps of receiving frame difference information, specifying changed pixels, whose values change between a frame to be displayed and a currently displayed frame, controlling the display of the frame such as to equalize the level of viewer perception of brightness to a predetermined level for each frame to be displayed depending on the frame difference information, and driving the display matrix to display the frame to be displayed by redrawing only the changed pixels.

The method may further comprise the step of receiving encoded source frames with embedded frame difference information and extracting the frame difference information from the encoded source frames.

The method may further comprise the step of receiving the frame of the source video signal to be displayed, recalling the currently displayed frame, and comparing the values of pixels of the frame to be displayed and the currently displayed frame to generate the frame difference information.

Equalizing the level of viewer perception of brightness may comprise processing the frame difference information such as to make the amount of pixels changed in the frame equal to a predefined pixels change amount.

Equalizing the level of viewer perception of brightness may comprise controlling the display matrix brightness level depending on the amount of changed pixels in the frame to be displayed.

Another object of the invention is a computer program comprising program code means for performing all the steps of the above method when said program is run on a computer.

A still further object of the invention is a computer readable medium storing computer-executable instructions performing all the steps of the above computer-implemented method when executed on a computer.

BRIEF DESCRIPTION OF DRAWINGS

The invention will be described with reference to a drawing, in which:

FIG. 1 presents exemplary source frames of a digital video source signal and difference frames, indicating the differences between the consecutive source frames;

FIGS. 5A and 5B present exemplary dependencies of brightness correction factor versus amount of pixels changed.

MODES FOR CARRYING OUT THE INVENTION

Figure 2:
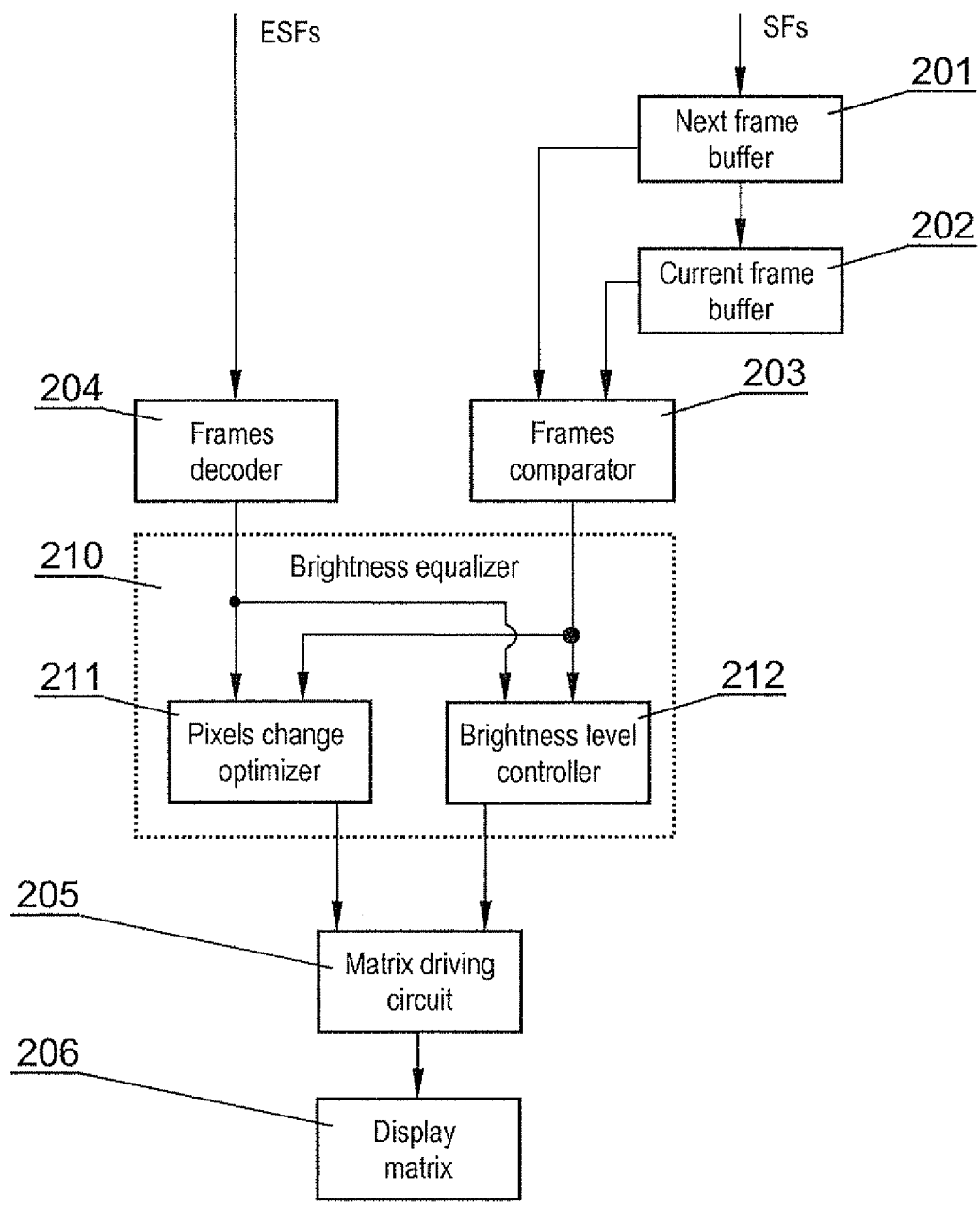
FIG. 2 presents an embodiment of a structure of a display matrix controller according to the invention.

FIG. 1 presents exemplary source frames 111-114 of a digital video source signal and difference frames 121-123, indicating the differences between the consecutive source frames. For clarity, the signals shown in FIG. 1 comprise relatively small frames, 10×10 pixels. However, the concept can be extended to signals with larger frames, such as 720×576 pixels (ITU-R 601 PAL format) or 1920×1080 pixels (Full HD resolution, as defined by ITU-R BT.709). The difference frame 121 indicates that 20 pixels are changed between frames 112 and 111, the difference frame 122 indicates that 12 pixels are changed between frames 113 and 112 and the difference frame 123 indicates that 4 pixels are changed between frames 114 and 113. A typical display matrix controller is configured to redraw the whole matrix in order to display a consecutive source frame. However, it can be seen from the difference frames, that when the source frame 112 is to be displayed after the source frame 111, only 20% of pixels need to be redrawn, when the source frame 113 is to be displayed next, only 12% of pixels need to be redrawn and when the source frame 114 is to be displayed next, only 4% of pixels need to be redrawn.

The video signal according to FIG. 1 may have embedded information defining the maximum number of changed pixels between frames of the whole event conveyed in the video signal. It is to be understood that different events may have different parameters with respect to number of changed pixels. This value may depend on the kind of content the event covers. For example different values may be used for an interview event while another value will be used for an action movie.

Therefore, in case of frames with small number of pixels to be redrawn, the time to display a frame may be reduced by configuring a matrix driving circuit to redraw only the changed pixels. However, such solution might result in a different level of viewer perception of brightness for frames which have different amount of changed pixels, due to the fact that the frames are viewed by the viewer via the shutter glasses for different time durations. Therefore, in order to achieve not only a reduced time to display a frame, and therefore a higher active viewing coefficient, but also a uniform level of brightness perception, the display matrix controller further comprises a brightness equalizer configured to control the display of the frame such as to equalize the level of viewer perception of brightness to a predetermined level for each displayed frame depending on the amount of changed pixels in the frame.

Two exemplary embodiments of the method for equalizing the viewer perception of brightness are provided, namely change of the amount of pixels in the frame and correcting the brightness of all pixels. In the first case, the control of the display of the frame is made by processing the frame such as to make the amount of pixels changed in the frame equal to a predefined pixels change amount, which guarantees that each frame will be redrawn for the same amount of time. In the second case, the control of the display of the frame is made by control the display matrix brightness level depending on the amount of changed pixels in the frame to be displayed, i.e. for frames with a lower amount of changed pixels a lower brightness correction factor is applied with respect to frames with a higher amount of changed pixels, which are redrawn for a longer time.

FIG. 2 presents an embodiment of a structure of a display matrix controller according to the invention. The display matrix controller may be configured to receive pre-processed encoded source frames (ESFs) with embedded frame difference information and/or typical source frames (SFs) without embedded frame difference information.

Typical source frames (SFs) of a video signal to be displayed are received by a next frame buffer 201. A currently displayed frame, i.e. the previously received frame, is stored in a current frame buffer 202. The currently displayed frame and the frame to be displayed are input to a frames comparator 203, which determines the differences between the frames. The frames comparator 203 outputs specifying changed pixels, whose values change between a frame to be displayed and a currently displayed frame.

The pre-processed encoded source frames (ESFs) with embedded frame difference information are received by a frames decoder 204, configured to extract the frame difference information from the encoded source frames. The pre-processed encoded source frames may be provided from a signal encoder embedded within the same video display unit as the display matrix controller, or from an external signal encoder, such as encoder embedded in digital video player, a PC computer or a digital television set-top box.

Therefore, each of the frames comparator 203 and the frames decoder 204 functions as an input interface configured to provide frame difference information, specifying changed pixels, whose values change between a frame to be displayed and a currently displayed frame.

The frame difference information may have a form of difference frames as shown in FIG. 1. The frame difference information may also comprise a sequence of values defining the pixel row position of changed pixels, the pixel column position and the pixel value, arranged for example by row number and then by column number. For example, the frame difference information corresponding to the difference frame 123 shown in FIG. 1 could have the following form:

{5,5,1; 5,6,1; 6,5,1; 6,6,1}

Optionally also a number specifying the total amount of changed pixels may be given in order to obviate the need for computation of this parameter. In the above example, a number "4" would be given.

The frame difference information from the frames comparator 203 or from the frames decoder 204 is input to a brightness equalizer 210, configured to control the display of the frame such as to equalize the level of viewer perception of brightness to a predetermined level for each frame to be displayed depending on the frame difference information. The level of viewer perception of brightness depends on the duration for which the viewer watches the frame, i.e. the active viewing coefficient for the frame, and the brightness level of the display when the frame is displayed.

The brightness equalizer may comprise a pixels change optimizer 211 and/or a brightness level controller 212.

The pixels change optimizer 211 is configured to process the frame difference information such as to make the amount of pixels changed in the frame equal to a predefined pixels change amount. Since the time of frame redraw by the matrix driving circuit 205 is proportional to the number of pixels to be redrawn, therefore by equalizing the amount of pixels changed in each frame to a predefined pixels change amount, each frame will be redrawn by the matrix driving circuit 205 for the same time. Therefore, the active viewing coefficient for each frame will be the same, and so the level of viewer perception of brightness for each frame will be equal to a predetermined level. A detailed operation of the pixels change optimizer 211 is described with reference to FIG. 4.

The brightness level controller 212 is configured to control the display matrix brightness level depending on the amount of changed pixels in the frame to be displayed, by sending a brightness control signal to the matrix driving circuit 205. The overall matrix brightness is set to a higher value for frames with a higher amount of new pixels, which are redrawn for a longer time and therefore viewed by the viewer for a shorter time, as compared to frames with a lower amount of new pixels, which are redrawn for a shorter time and therefore viewed by the viewer for a longer time. The shorter the viewer views a frame, the less light is collected by the eye, and the brightness of such frame is perceived as darker. Therefore, if the brightness level for each frame is controlled depending on the amount of changed pixels in the frame, the level of viewer perception of brightness for each frame will be the same.

It is sufficient if the brightness equalizer 210 comprises only one of the pixels change optimizer 211 or the brightness level controller 212. Alternatively, the brightness equalizer may comprise both modules and select the module to be used depending on the amount of pixels changed or content type. Sometimes a viewer might prefer to use pixels change optimizer 211 instead of the brightness level controller 212 based on subjective perception, hence the user may be provided with an option of choosing how the brightness equalizer 210 operates.

For example, if most of the frames of the source video signal comprise a high amount of changed pixels, then it might be preferable to use the brightness level controller 212 rather than the pixels change optimizer 211, which might introduce too much change, leading to degradation of the content of the frames. In case the brightness equalizer 210 does not comprise the pixels change optimizer 211 or the pixels change optimizer 211 is inactive, the frame difference information is sent from the input interface 203, 204 directly to the matrix driving circuit 205.

The frame difference information is received by a matrix driving circuit 205, which is configured to receive the frame difference information and to drive the display matrix 206 to display the frame to be displayed by redrawing only the changed pixels. The matrix driving circuit 205 may be also configured to periodically redraw the unchanged pixels, if the display matrix 206 requires that all pixels are to be redrawn within a specific period. The unchanged pixels may be redrawn after or before the changed pixels. In such case, the display matrix controller may be configured to control the shutter glasses opening and closing times such that the shutter glasses are closed only during the period for redrawing the changed pixels, and such that the shutter glasses are open during the period for redrawing the unchanged pixels, since redrawing of the unchanged pixels, as refreshing of the unchanged pixels is invisible to the viewer.

The matrix driving circuit 205, having received the above exemplary signal describing a difference frame 123 shown in FIG. 1, would consecutively reprogram the $5^{th}$ column of the $5^{th}$ row into a value of 1, the $6^{th}$ column of the $5^{th}$ row into a value of 1, the $5^{th}$ column of the $6^{th}$ row into a value of 1 and the $6^{th}$ column of the $6^{th}$ row into a value of 1. Such operation thus involves only 4 reprogramming steps, in comparison to 100 reprogramming steps in case of full frame reprogramming.

Figure 3:
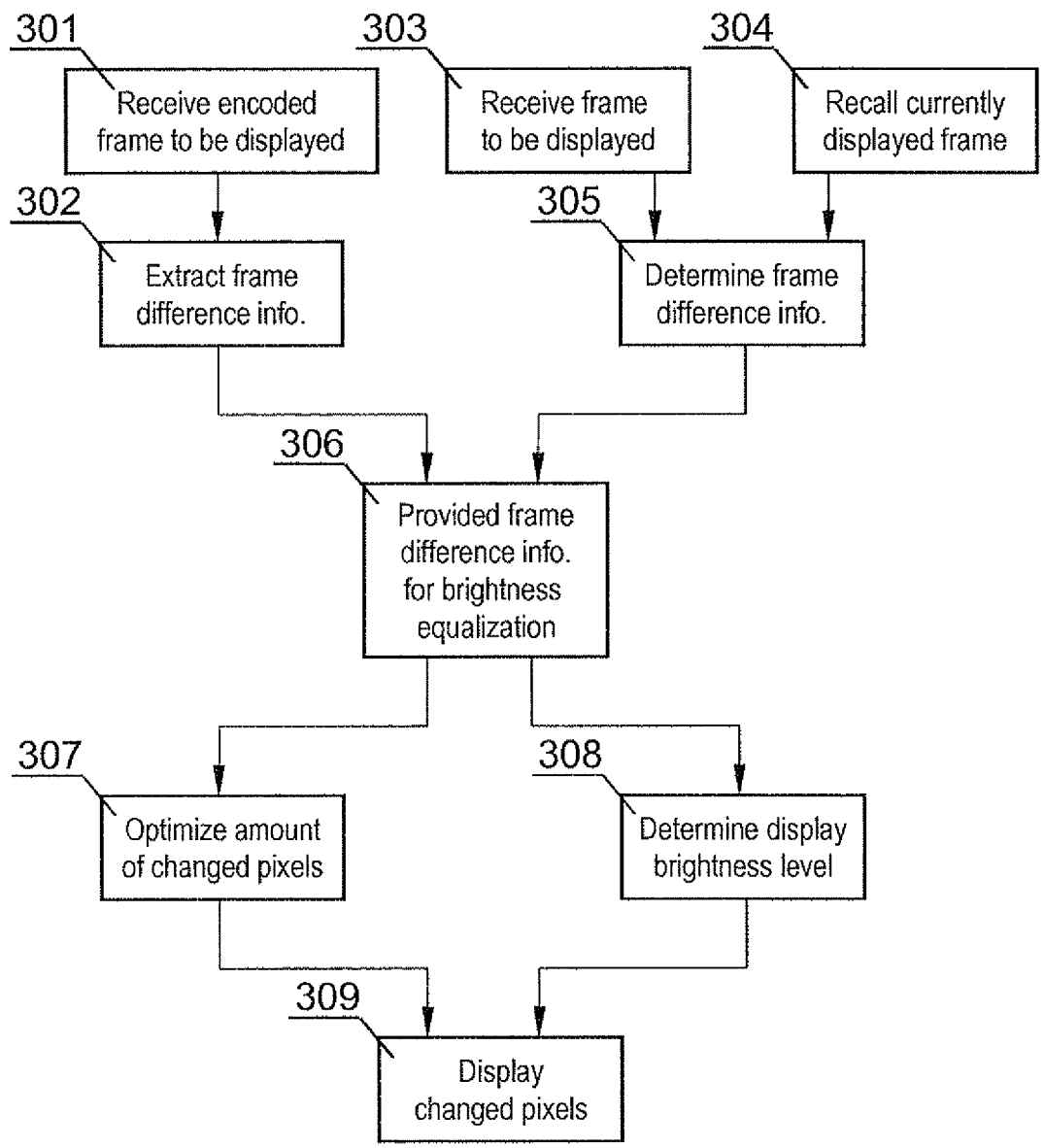
FIG. 3 presents a method for controlling the display of a digital video source signal.

FIG. 3 presents a method for controlling the display of a digital video source signal. The first part of the method may be performed according to steps 301-302, in case pre-processed encoded source frames with embedded frame difference information are received from the source video stream or according to steps 303-305 in case typical source frames without embedded frame difference information are received from the source video stream. Therefore, in step 301 the encoded source frame to be displayed is received and in step 302 the frame difference information is extracted from the encoded source frame. Alternatively, in step 303 a typical source frame to be displayed is received, in step 304 a typical source frame currently displayed is recalled (which is the frame received in step 303 in the previous cycle of the procedure) and in step 305 the frame difference information is determined by comparing and specifying the differences between the pixels of the frame to be displayed and the currently displayed frame. In step 306 the frame difference information collected in steps 302 or 305 is provided for brightness equalization. In addition of frame difference information the system needs to establish pixels threshold that will occur throughout the event conveyed in the video signal. The pixels threshold will allow for establishing what will be the minimum perceived brightness without correction. Typically this level of changes will be assigned to maximum display brightness. If the number of changed pixels lowers below pixels threshold as a result the set display brightness will also be lowered to compensate for the longer viewing time.

The brightness equalization may be performed according to steps 307 or 308, depending on a specific implementation of the method, to control the display of the frame such as to equalize the level of viewer perception of brightness to a predetermined level for each frame to be displayed depending on the frame difference information. In step 307 the amount of changed pixels is optimized by processing the frame difference information such as to make the amount of pixels changed in the frame equal to a predefined pixels change amount, according to the procedure shown in FIG. 4. In step 308, the display brightness level is determined according to the brightness curve shown in FIG. 5A or 5B. Next, the changed pixels are displayed on the display matrix, wherein either the amount of changed pixels is equalized or the overall brightness level of the display matrix is adjusted to the time of redraw of the frame.

Figure 4:
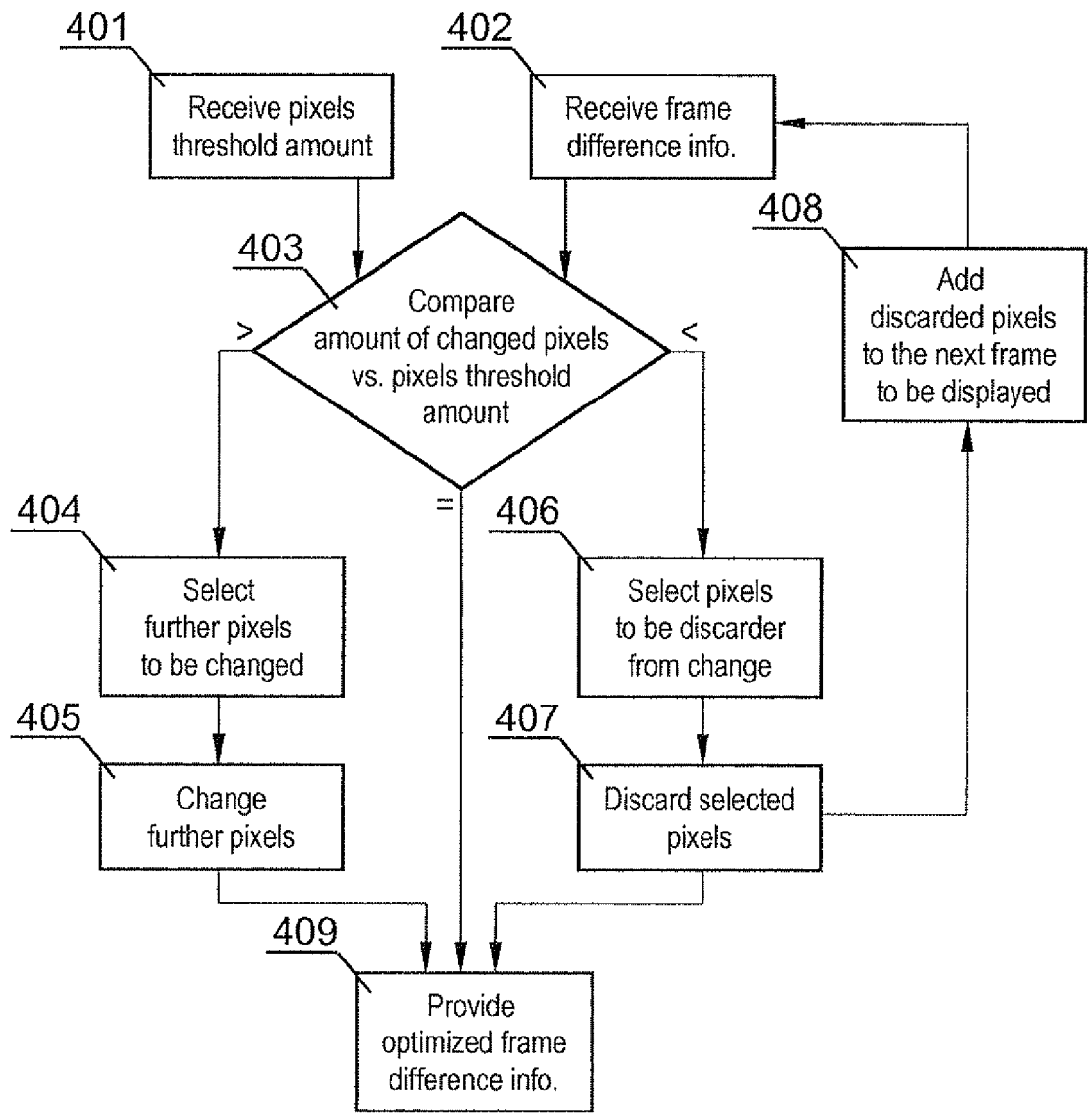
FIG. 4 presents a method for optimizing the amount of changed pixels.

FIG. 4 presents a method for optimizing the amount of changed pixels. In step 401 the pixels threshold amount is received, which can be constant throughout the whole source video signal or constant for a fragment of the source video signal. In step 402 a frame difference information for the frame to be displayed is received, specifying the pixels changed with respect to the currently displayed frame. Next, in step 403, the amount of changed pixels within the frame to be displayed is compared with the pixels threshold amount. In case the amounts are equal, the amount of pixels within the frame is already optimized and provided in step 409 to be displayed.

In case the frame difference information comprises less changed pixels than the pixels threshold amount, further pixels to be changed are selected in step 404, such as to make the total number of pixels changed equal or substantially equal to the pixels threshold amount. The further pixels to be changed may be selected from the pixels shown at the border of the screen, which are less visible to the viewer. The selected further pixels are changed in step 405 by a minimal amount, so as to limit the visibility of their change to the viewer. For example pixel colour may be changed by 1. Such a change will not be recognized by a typical viewer's eye.

In case the frame difference information comprises more changed pixels than the pixels threshold amount, some pixels are selected to be discarded in step 406, such as to make the total number of pixels changed equal to the pixels threshold amount. The pixels to be changed may be selected according to various algorithms. For example, the pixels whose value differs least between the frame to be displayed and the currently displayed frame may be selected to be discarded. Furthermore, pixels to be discarded may be selected from pixels belonging to one or more frame regions, such as lines or macroblocks. Furthermore, the procedure may analyze frame difference information for a plurality of consecutive frames and discard pixels which change only between single frames, i.e. are most probable to represent noise rather than an intentional change of frame content. In step 408 the discarded pixels are added to the frame difference information for the next frame to be displayed, in order to be taken into account during analysis of the next frame.

Finally, in step 409, the optimized frame difference information, comprising the amount of changed pixels equal to the predefined pixels threshold amount, is provided to be displayed at the display matrix.

The pixels threshold may be read from the received video signal or arbitrarily set by a viewer who may test various threshold settings.

FIGS. 5A and 5B present exemplary dependencies of brightness correction factor versus amount of pixels changed. The amount of pixels to be changed influences the active viewing coefficient, i.e. the more pixels to be changed, the longer the frame redraw time and so the shorter the time at which the shutter glasses are open and so the lower the active viewing coefficient. Signals with lower active viewing coefficients are viewed as darker than signals with higher active viewing coefficients, which are perceived by the viewer eyes for longer time slots when the shutter glasses are open. In order to provide a correct perception of signal brightness, the brightness level controller 212 is configured to control the display matrix brightness level for example by a brightness correction factor, specifying the amount of brightness increase over a typical brightness level for a stationary signal. The brightness correction factor may be linear with respect to the amount of changed pixels, as shown in FIG. 5A or non-linear, as shown in FIG. 5B, depending on the way the display matrix controller operates and the time it is necessary to redraw the frame for a given changed pixels amount.

It can be easily recognised, by one skilled in the art, that the aforementioned method for controlling the display of the video signal may be performed and/or controlled by one or more computer programs. Such computer programs are typically executed by utilizing the computing resources in a computing device such as personal computers, personal digital assistants, cellular telephones, receivers and decoders of digital television or the like. Applications are stored in non-volatile memory, for example a flash memory or volatile memory, for example RAM and are executed by a processor. These memories are exemplary recording media for storing computer programs comprising computer-executable instructions performing all the steps of the computer-implemented method according the technical concept presented herein.

The present invention may be implemented using any display, for example on a computer monitor, a television display, a mobile phone, PDA, or a laptop computer.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

The invention claimed is:

1. A stereoscopic display matrix controller configured to drive a display matrix (206, 308) to display frames of a stereoscopic source video signal, the controller comprising:
an input interface (203, 204) configured to provide, for each frame to be displayed, a frame difference information, specifying changed pixels, whose values change between a frame to be displayed and a currently displayed frame;
a brightness equalizer (210) configured control the display of the frame to be displayed and comprising a pixels change optimizer (211) configured to process the frame difference information such as to make the amount of pixels changed in the frame to be displayed equal to a predefined pixels change amount lower than the amount of all pixels in the frame by:
in case the amount of pixels changed in the frame is lower than the predefined pixels change amount, selecting further pixels to be changed and changing the selected pixels; and in case the amount of pixels changed in the frame is higher than the predefined pixels change amount, selecting pixels to be discarded from change, discarding the selected pixels and adding the discarded pixels to the frame difference information for the next frame to be displayed; and a matrix driving circuit (205, 307) configured to receive the frame difference information and to drive the display matrix (206, 308) to display the frame to be displayed by redrawing only the changed pixels.

2. The stereoscopic display matrix controller according to claim 1, wherein the input interface comprises a frames decoder (204) configured receive encoded source frames with embedded frame difference information and to extract the frame difference information from the encoded source frames.

3. The stereoscopic display matrix controller according to claim 1, further comprising a next frame buffer (201) configured to store the frame of the source video signal to be displayed;

a current frame buffer (202) configured to store the currently displayed frame of the source video signal; and wherein the input interface comprises a frames comparator (203) configured to receive the frame to be displayed from the next frame buffer (201) and the currently displayed frame from the current frame buffer (202) and to compare the values of pixels of the frame to be displayed and the currently displayed frame to generate the frame difference information.

4. The stereoscopic display matrix controller according to claim 1, wherein the brightness equalizer (210) comprises a brightness level controller (212) configured to control the display matrix brightness level depending on the amount of changed pixels in the frame to be displayed.

5. A display unit comprising the display matrix controller according to claim 1.

6. A method for controlling a display matrix to display frames of a stereoscopic source video signal, the method comprising the steps of:

receiving frame difference information, specifying changed pixels, whose values change between a frame to be displayed and a currently displayed frame;

controlling the display of the frame to be displayed by processing (307) the frame difference information such as to make the amount of pixels changed in the frame to be displayed equal to a predefined pixels change amount lower than the amount of all pixels in the frame by:

in case the amount of pixels changed in the frame is lower than the predefined pixels change amount, selecting (404) further pixels to be changed and changing (405) the selected pixels;

in case the amount of pixels changed in the frame is higher than the predefined pixels change amount, selecting (406) pixels to be discarded from change, discarding (407) the selected pixels and adding (408) the discarded pixels to the frame difference information for the next frame to be displayed; and driving the display matrix to display the frame to be displayed by redrawing only the changed pixels.

7. The method according to claim 6, further comprising the step of receiving encoded source frames with embedded frame difference information and extracting the frame difference information from the encoded source frames.

8. The method according to claim 6, further comprising the steps of receiving the frame of the source video signal to be displayed, recalling the currently displayed frame, and comparing the values of pixels of the frame to be displayed and the currently displayed frame to generate the frame difference information.

9. A non-transitory computer readable medium storing computer-executable instructions for controlling a display matrix to display frames of a stereoscopic source video signal, the computer-readable code comprising program code for:

receiving frame difference information, specifying changed pixels, whose values change between a frame to be displayed and a currently displayed frame;

controlling the display of the frame to be displayed by processing (307) the frame difference information such as to make the amount of pixels changed in the frame to be displayed equal to a predefined pixels change amount lower than the amount of all pixels in the frame by:

in case the amount of pixels changed in the frame is lower than the predefined pixels change amount, selecting (404) further pixels to be changed and changing (405) the selected pixels;

in case the amount of pixels changed in the frame is higher than the predefined pixels change amount, selecting (406) pixels to be discarded from change, discarding (407) the selected pixels and adding (408) the discarded pixels to the frame difference information for the next frame to be displayed; and driving the display matrix to display the frame to be displayed by redrawing only the changed pixels when executed on a computer.

\* \* \* \* \*